(12) United States Patent
Wang

(10) Patent No.: US 10,017,220 B2
(45) Date of Patent: Jul. 10, 2018

(54) FOLDABLE TRAINING WHEEL DEVICE

(71) Applicant: Tai-Chih Wang, Taichung (TW)

(72) Inventor: Tai-Chih Wang, Taichung (TW)

( * ) Notice: Subject to any disclaimer, the term of this patent is extended or adjusted under 35 U.S.C. 154(b) by 96 days.

(21) Appl. No.: 15/184,050

(22) Filed: Jun. 16, 2016

(65) Prior Publication Data

US 2017/0361886 A1  Dec. 21, 2017

(51) Int. Cl.
*B62H 1/12* (2006.01)
*B62H 1/02* (2006.01)

(52) U.S. Cl.
CPC .................. *B62H 1/12* (2013.01); *B62H 1/02* (2013.01)

(58) Field of Classification Search
CPC ..................................... B62H 1/12; B62H 1/02
USPC .................................................... 280/301, 298
See application file for complete search history.

(56) References Cited

U.S. PATENT DOCUMENTS

| | | | | |
|---|---|---|---|---|
| 453,094 A * | 10/1891 | Taylor | ...................... | B62H 1/12 |
| | | | | 280/301 |
| 1,077,210 A * | 10/1913 | Alesani | .................... | B62H 1/12 |
| | | | | 280/203 |
| 1,233,300 A * | 7/1917 | Bancalari | ................. | B62H 7/00 |
| | | | | 280/304 |
| 5,100,163 A * | 3/1992 | Egley | ....................... | B62H 1/12 |
| | | | | 280/293 |
| 5,352,403 A * | 10/1994 | Egley | ....................... | B62H 1/12 |
| | | | | 280/293 |
| 5,419,575 A * | 5/1995 | Shepherd | ................. | B62H 1/00 |
| | | | | 280/293 |
| 6,149,179 A * | 11/2000 | Long | ........................ | B62H 1/00 |
| | | | | 280/288.4 |
| 6,331,012 B1 * | 12/2001 | Eisenmann, II | ......... | B62H 1/12 |
| | | | | 280/293 |
| 6,705,632 B2 * | 3/2004 | Yoshida | ................... | B62H 1/12 |
| | | | | 280/288.4 |
| 7,815,208 B1 * | 10/2010 | Lin | ...................... | B62K 15/006 |
| | | | | 280/293 |

* cited by examiner

*Primary Examiner* — Tony H Winner
(74) *Attorney, Agent, or Firm* — Birch, Stewart, Kolasch & Birch, LLP

(57) ABSTRACT

A foldable training wheel device has an outer tube, an inner tube, a positioning module, and a training wheel. The inner tube is inserted in the outer tube, is rotatable in the outer tube, is up and down moveable in the outer tube, and has a riding position and a folded position. The positioning module is mounted on the outer tube and the inner tube to position the inner tube on one of the riding position and the folded position relative to the outer tube. The training wheel is mounted on a bottom of the inner tube. Therefore, the foldable training wheel device is provided with two using modes for users.

20 Claims, 8 Drawing Sheets

FOLDABLE TRAINING WHEEL DEVICE

BACKGROUND OF THE INVENTION

1. Field of the Invention

The present invention relates to a training wheel device, and more particularly to a foldable training wheel device.

2. Description of Related Art

A conventional training wheel is mounted on a side of a rear wheel of a bicycle to assist a child with riding the bicycle. The conventional training wheel is generally mounted on the wheel by a nut structure.

When the training wheel is disassembled from the rear wheel, the nut structure is first disassembled from the training wheel and the rear wheel. After the training wheel is disassembled from the rear wheel, the nut structure is assembled on the rear wheel again. An assembling process of the conventional training wheel is inconvenient for a user, and needs to be improved.

SUMMARY OF THE INVENTION

The main objective of the present invention is to provide an improved foldable training wheel device to overcome the abovementioned problems.

The foldable training wheel device comprises an outer tube, an inner tube, a positioning module, and a training wheel.

The outer tube is hollow.

The inner tube is inserted in the outer tube, is rotatable in the outer tube, is up and down moveable in the outer tube, and has a riding position and a folded position.

The positioning module is mounted on the outer tube and the inner tube to position the inner tube on one of the riding position and the folded position of the inner tube relative to the outer tube, and comprises a positioning unit, an engagement unit, and a restoring unit. The positioning unit is mounted on a bottom of the outer tube, and comprises at least one riding recess and at least one folding recess. The at least one riding recess is recessed in the positioning unit. The at least one folding recess is recessed in the positioning unit, and corresponds to the folded position. The engagement unit is mounted on the inner tube and selectively engaged in one of the at least one riding recess and the at least one folding recess. When the engagement unit is engaged in the at least one riding recess, the inner tube is positioned on the riding position. When the engagement unit is engaged in the at least one folding recess, the inner tube is positioned on the folded position. The restoring unit abuts between the outer tube and the inner tube.

The training wheel is mounted on a bottom of the inner tube.

Other objectives, advantages and novel features of the present invention will become more apparent from the following detailed description when taken in conjunction with the accompanying drawings.

DETAILED DESCRIPTION OF PREFERRED EMBODIMENT

Figure 1:
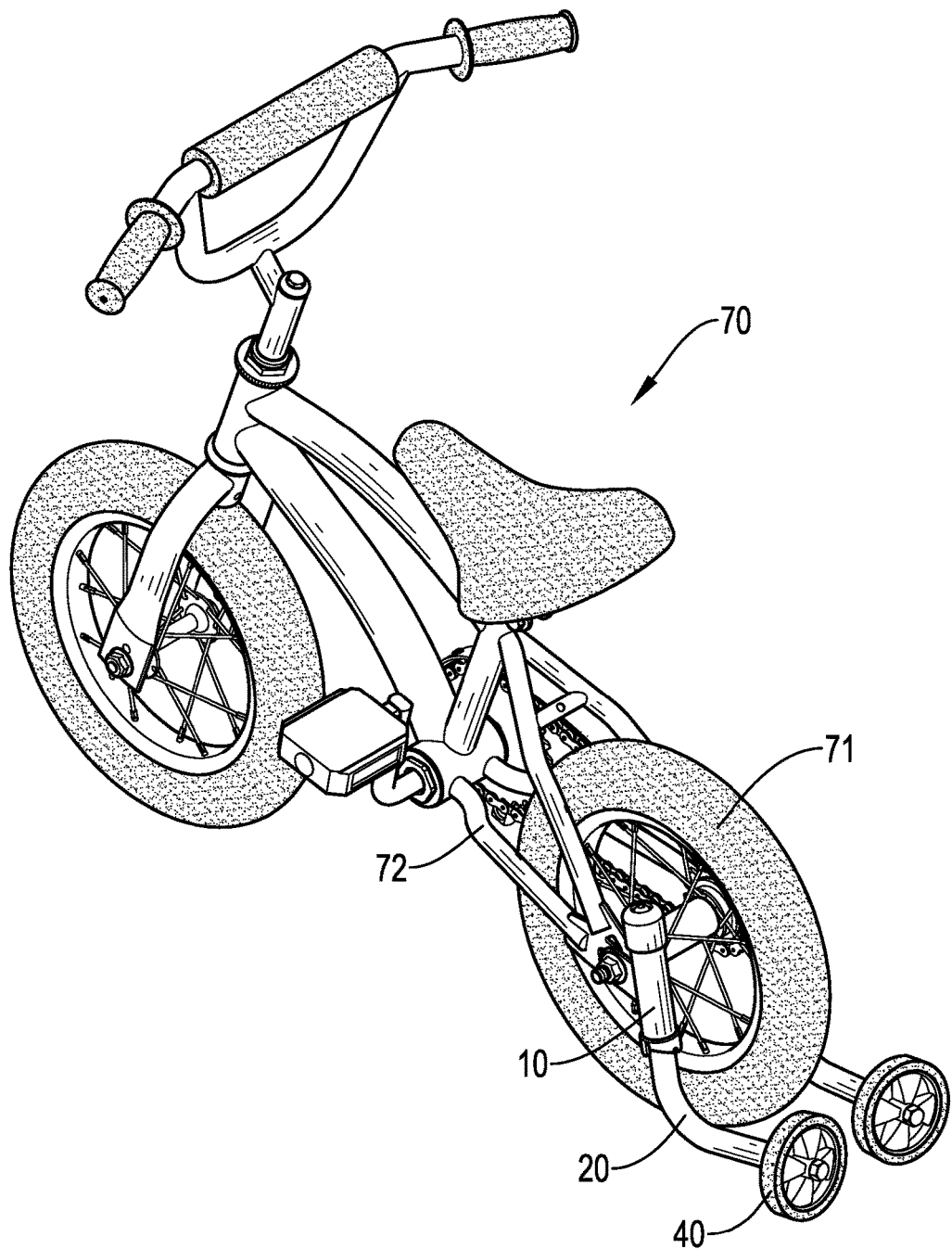
FIG. 1 is a first preferred embodiment of a foldable training wheel device in accordance with the present invention, which is combined with a bicycle.
Figure 2:
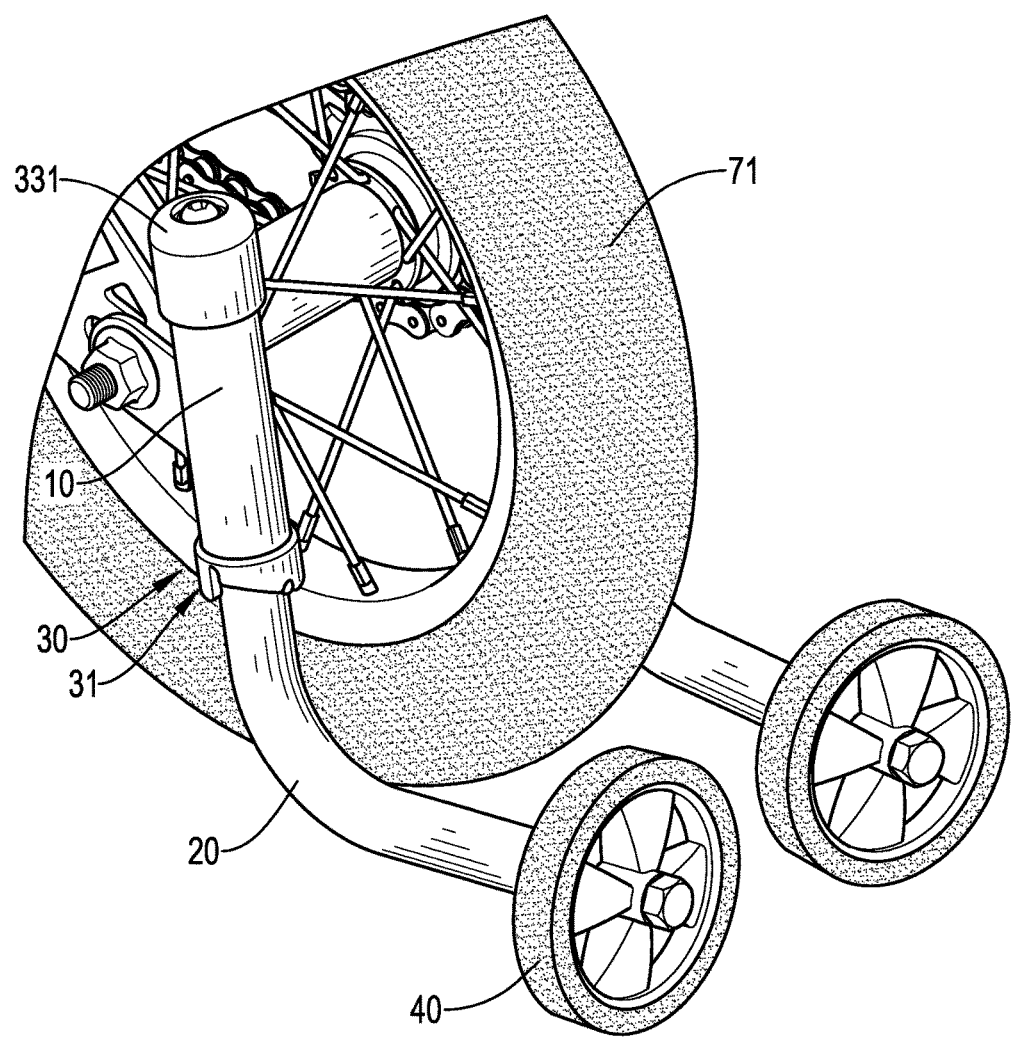
FIG. 2 is an enlarged perspective view of the foldable training wheel device combined with the bicycle in FIG. 1.

With reference to FIGS. 1 to 3 and 5, a first preferred embodiment of a foldable training wheel device of the present invention is applied on a side of a frame 72 of a bicycle 70 and is located on a side of a rear wheel 71 of the bicycle 70 for a child to assist the child with riding the bicycle 70. The foldable training wheel device comprises an outer tube 10, an inner tube 20, a positioning module 30, and a training wheel 40. The outer tube 10 is disposed on the side of the frame 72. Preferably, the outer tube 10 is mounted on the frame 72 by a bolt 73 and a nut 74. The outer tube 10 comprises a connection plate 11 formed on a side of the outer tube 10. The bolt 73 is mounted on the frame 72, and is inserted through the connection plate 11. The nut 74 is mounted on a side of the connection plate 11 opposite the bolt 73, and the bolt 73 is combined with the nut 74 to dispose the outer tube 10 on the frame 72.

The outer tube 10 is hollow. The inner tube 20 is inserted in the outer tube 10, and is rotatable and up and down moveable relative to the outer tube 10. The positioning module 30 is mounted on the outer tube 10 and the inner tube 20 to position the inner tube 20 on a riding position P1 or a folded position P2 relative to the outer tube 10. The training wheel 40 is mounted on a bottom of the inner tube 20. In a riding condition, the inner tube 20 is positioned on the riding position P1, and the training wheel 40 contacts the ground to assist the child with riding the bicycle 70. In a folded condition, the inner tube 20 is positioned on the folded position P2 to form a folded state relative to the bicycle 70.

Figure 4:
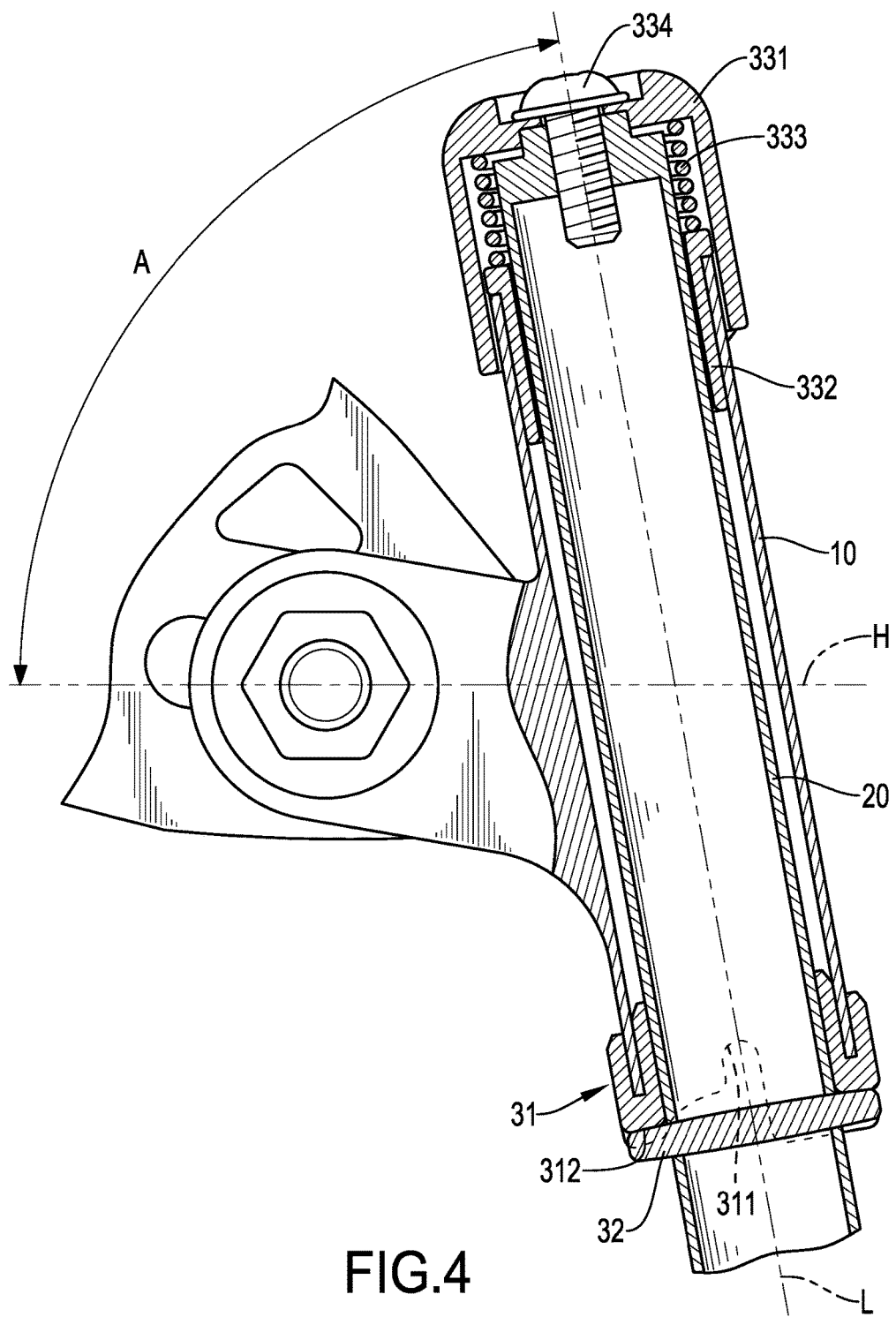
FIG. 4 is an enlarged side view in partial section of the foldable training wheel device combined with the bicycle in FIG. 1.

Further with reference to FIG. 4, the outer tube 10 has a longitudinal direction L. An inclined angle A is defined between the longitudinal direction L and a horizontal plane H. The inclined angle A is less than 90 degrees and larger than 0 degree, such that the outer tube 10 is inclined relative to the frame 72. Therefore, when the inner tube 20 is positioned on the folded position, the training wheel 40 is kept from contacting the ground.

Figure 5:
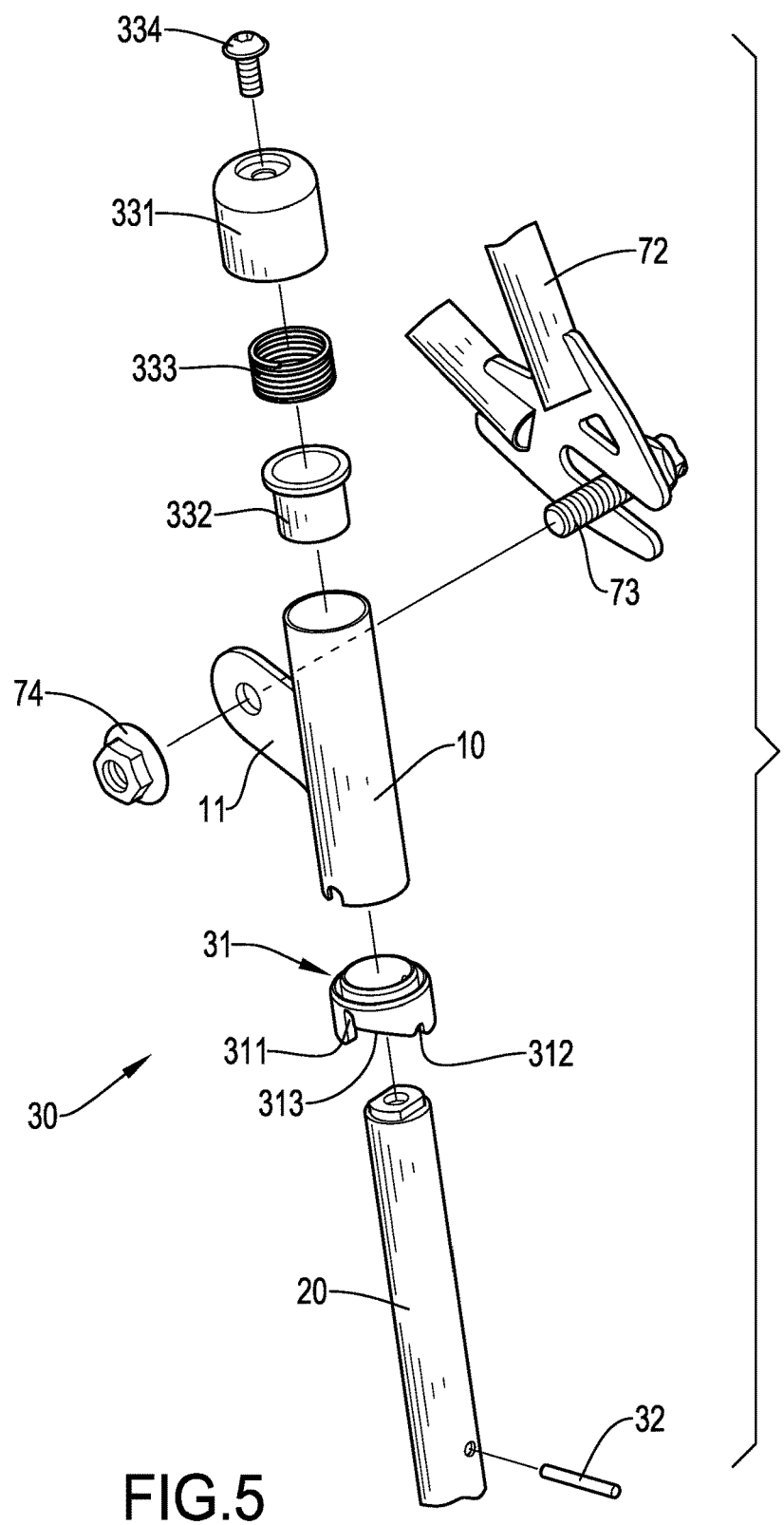
FIG. 5 is an exploded perspective view of the foldable training wheel device combined with the bicycle in FIG. 1.
Figure 6:
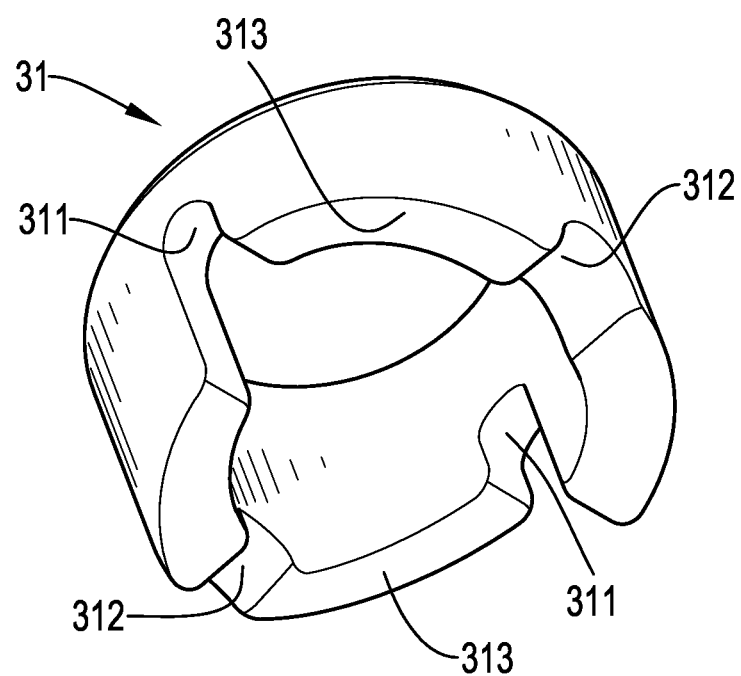
FIG. 6 is an enlarged perspective view of a positioning unit of the foldable training wheel device in FIG. 5.

With reference to FIGS. 4 to 6, the positioning module 30 comprises a positioning unit 31, an engagement unit 32, and a restoring unit 333. The positioning unit 31 is mounted on a bottom of the outer tube 10, and comprises at least one riding recess 311 recessed in the positioning unit 31, at least one folding recess 312 recessed in the positioning unit 31, and at least one guiding portion 313 connected between the at least one riding recess 311 and the at least one folding recess 312. The at least one riding recess 311 corresponds to the riding position P1. The at least one folding recess 312 corresponds to the folded position P2. Preferably, a depth of the at least one riding recess 311 is deeper than a depth of the at least one folding recess 312, and the at least one guiding portion 313 is implemented as an inclined surface.

The engagement unit 32 is mounted on the inner tube 20 and selectively engaged in the at least one riding recess 311 or the at least one folding recess 312. Preferably, the positioning unit 31 is implemented to have two riding recesses 311, two folding recesses 312, and two guiding portions 313. The two riding recesses 311 are recessed in the positioning unit 31 diametrically opposite each other. The two folding recesses 312 are recessed in the positioning unit 31 diametrically opposite each other. The two guiding portions 313 are respectively connected between the two riding recesses 311 and the two folding recesses 312. The engagement unit 32 is inserted through the inner tube 20 radially, and two ends of the engagement unit 32 protrude out of the inner tube 20. The two ends of the engagement unit 32 are respectively engaged in the two riding recesses 311 or the two folding recesses 312.

The restoring unit 333 abuts between the outer tube 10 and the inner tube 20. Preferably, the outer tube 10 further comprises an outer sleeve 331 mounted on a top of the outer tube 10 and combined with a top of the inner tube 20 by a fastening unit 334. The top of the inner tube 20 protrudes out of the top of the outer tube 10. The inner tube 20 further comprises an inner sleeve 332 inserted into the top of the outer tube 10 and mounted around the inner tube 20. A distance is formed between the inner sleeve 332 and the outer sleeve 331, and the restoring unit 333 is mounted within the distance between the inner sleeve 332 and the outer sleeve 331. Preferably, the restoring unit 333 is a spring.

Figure 3:
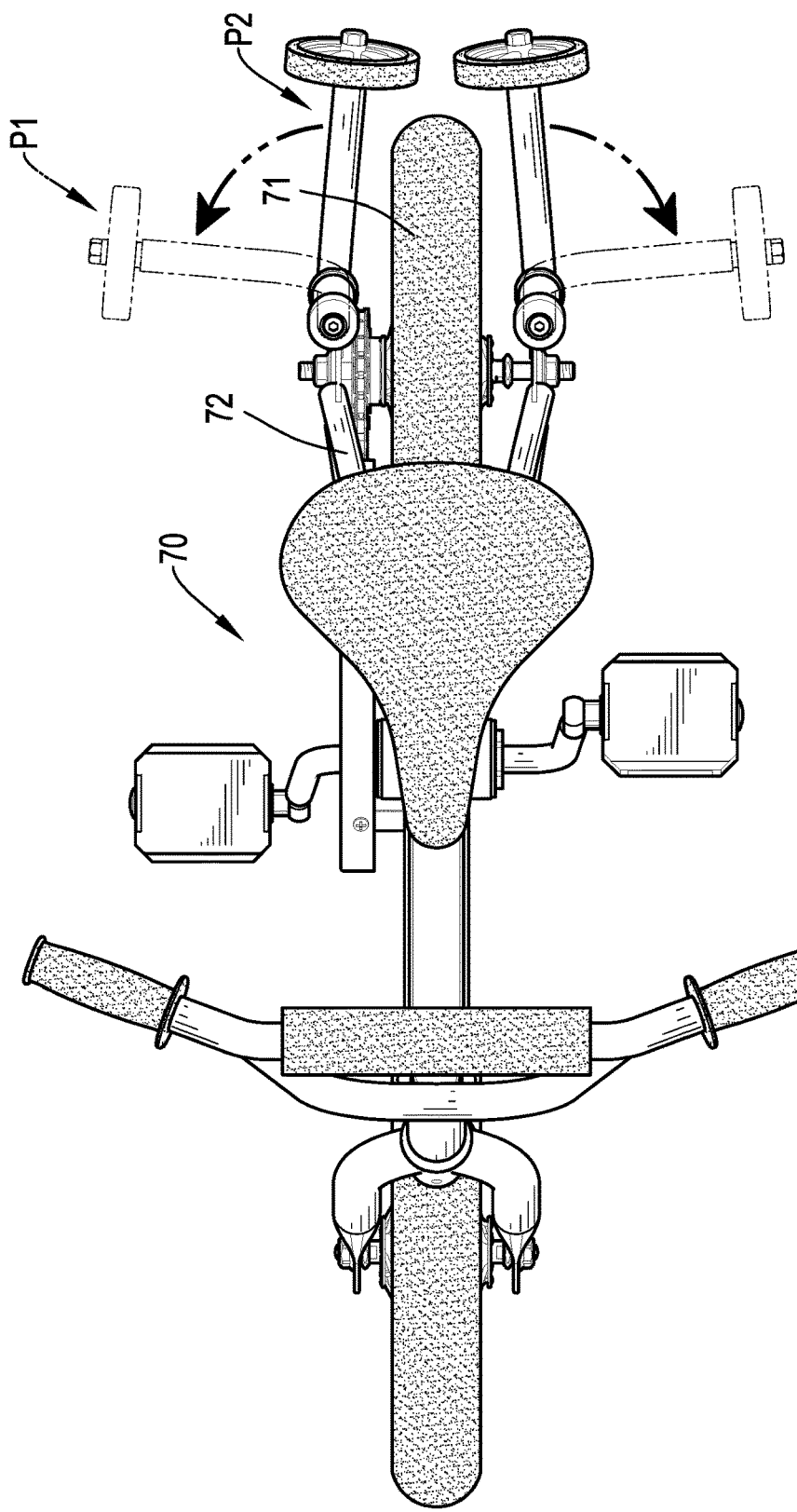
FIG. 3 is an operational top view of the foldable training wheel device combined with the bicycle in FIG. 1.
Figure 7:
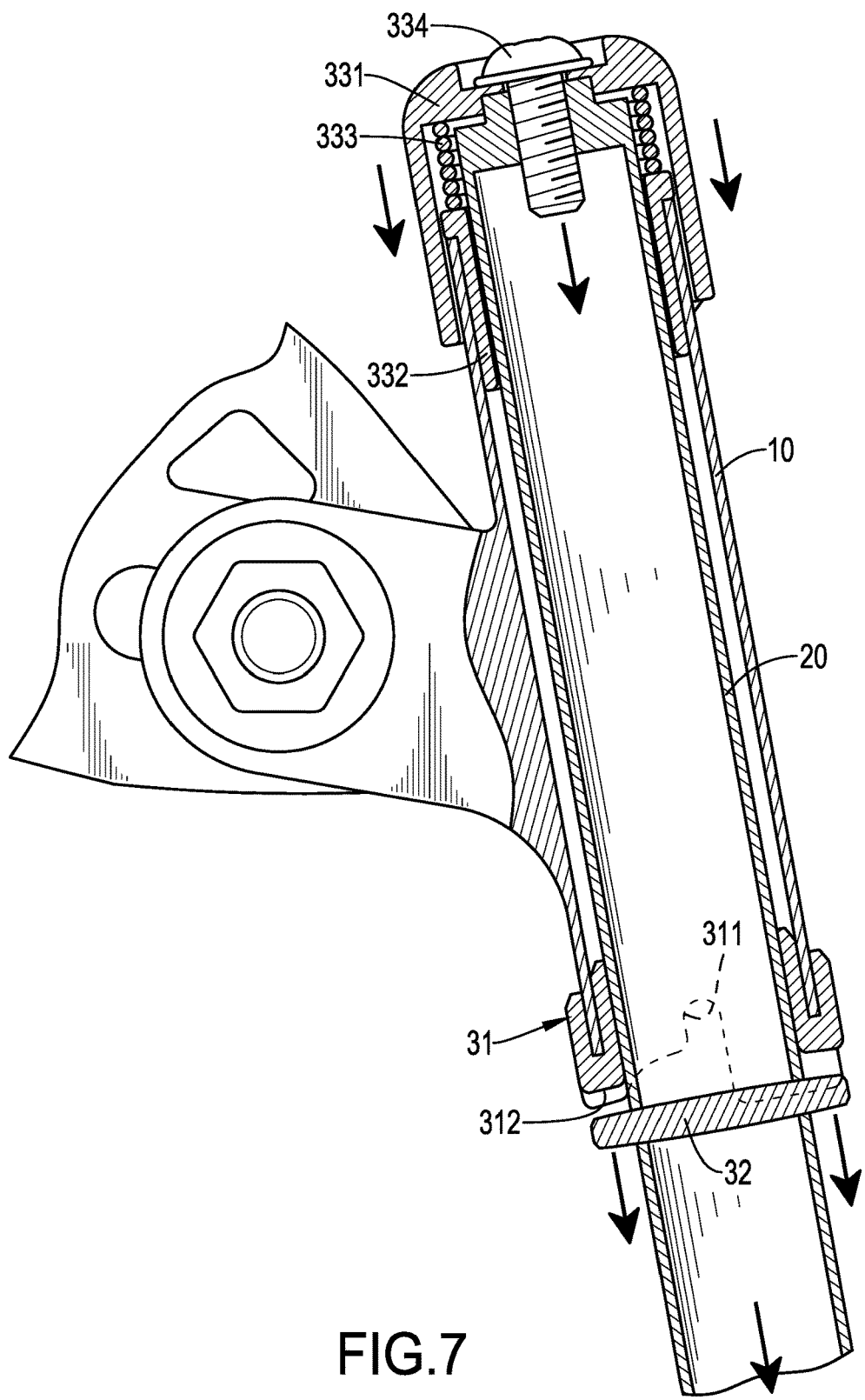
FIG. 7 is an enlarged operational side view in partial section of the foldable training wheel device combined with the bicycle in FIG. 1.

The inner tube 20 can be positioned on the riding position P1 by the positioning module 30 as shown in FIG. 3 for the riding use. When the inner tube 20 is positioned on the riding position P1, the engagement unit 32 is engaged in the riding recesses 311. When a user wants to fold the training wheel 40 relative to the bicycle 70, the inner tube 20 needs to be positioned on the folded position P2 as shown in FIG. 3. With reference to FIGS. 5 to 7, first, the inner tube 20 is pulled downwardly to drive the outer sleeve 331 to move downwardly, such that the engagement unit 32 will depart from the riding recesses 311. When the outer sleeve 331 moves downwardly, the restoring unit 333 is compressed to store a restoring force. Then, the inner tube 20 is rotated, and the training wheel 40 moves toward a rear of the bicycle 70. When the inner tube 20 is rotated, the engagement unit 32 will be engaged in the folding recesses 312 to be engaged with the positioning unit 31 again. When the two ends of the engagement unit 32 are moved from the riding recesses 311 to the folding recesses 312, the guiding portions 313 can respectively guide the two ends of the engagement unit 32. When the two ends of the engagement unit 32 are moved to the folding recesses 312, the inner tube 20 is released, and the restoring force of the restoring unit 333 will drive the inner tube 20 to move upwardly. Therefore, the engagement unit 32 can be engaged in the two folding recesses 312. When the engagement unit 32 is engaged in the two folding recesses 312, the inner tube 20 is positioned on the folded position P2 as shown in FIG. 3.

Figure 8:
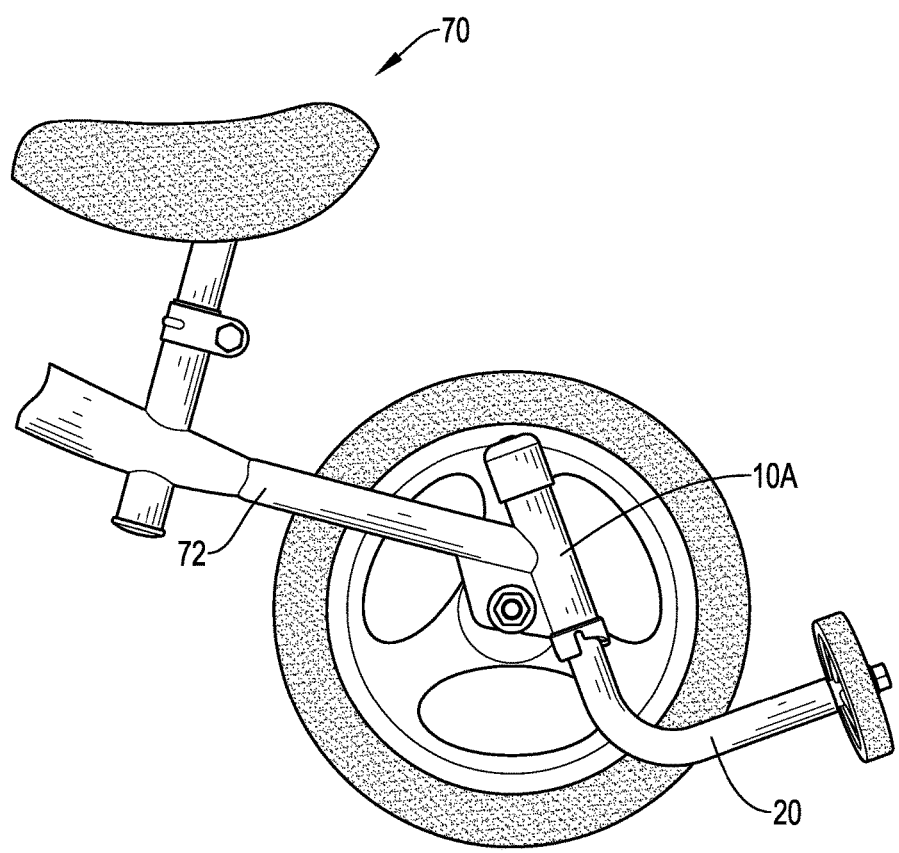
FIG. 8 is a side view of a second preferred embodiment of a foldable training wheel device in accordance with the present invention, which is welded on a bicycle.

A second preferred embodiment of the foldable training wheel device of the present invention is shown in FIG. 8. The connection plate is omitted, and the outer tube 10A is welded on the frame 72 of the bicycle 70.

From the above description, it is noted that the present invention has the following advantages: The inner tube 20 can be positioned on two different positions: the riding position P1 and the folded position P2. When the inner tube 20 is positioned on the riding position P1, the training wheel 40 can contact the ground to assist the child with riding the bicycle 70. When the inner tube 20 is positioned on the folded position P2, the inner tube 20 can form the folded state relative to the bicycle 70, such that the user does not need to disassemble the training wheel 40. The inner tube 20 can be switched between the riding position P1 and the folded position P2 to meet different demands of the user.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A foldable training wheel device comprising:
   an outer tube being hollow;
   an inner tube inserted in the outer tube, being rotatable in the outer tube, being up and down moveable in the outer tube, and having
   a riding position; and
   a folded position;
   a positioning module mounted on the outer tube and the inner tube to position the inner tube on one of the riding position and the folded position of the inner tube relative to the outer tube, and comprising
   a positioning unit mounted on a bottom of the outer tube, and comprising
   at least one riding recess recessed in the positioning unit; and
   at least one folding recess recessed in the positioning unit;
   an engagement unit mounted on the inner tube and selectively engaged in one of the at least one riding recess and the at least one folding recess, wherein when the engagement unit is engaged in the at least one riding recess, the inner tube is positioned on the riding position, and when the engagement unit is engaged in the at least one folding recess, the inner tube is positioned on the folded position;
   a restoring unit abutting between the outer tube and the inner tube; and
   a training wheel mounted on a bottom of the inner tube.

2. The foldable training wheel device as claimed in claim 1, wherein
   a depth of the at least one riding recess is deeper than a depth of the at least one folding recess; and
   the positioning unit further comprises at least one guiding portion respectively connected between the at least one riding recess and the at least one folding recess.

3. The foldable training wheel device as claimed in claim 2, wherein
   the at least one riding recess includes two riding recesses, the at least one folding recess includes two folding recesses, and the at least one guiding portion includes two guiding portions, wherein
   the two riding recesses are recessed in the positioning unit diametrically opposite each other;
   the two folding recesses are recessed in the positioning unit diametrically opposite each other;
   the two guiding portions are connected between the two riding recesses and the two folding recesses; and
   the engagement unit is inserted through the inner tube radially, and two ends of the engagement unit protrude out of the inner tube, wherein the two ends of the engagement unit are respectively and selectively engaged in the two riding recesses or the two folding recesses.

4. The foldable training wheel device as claimed in claim 3, wherein
the outer tube further comprises an outer sleeve mounted on a top of the outer tube and combined with a top of the inner tube;
the top of the inner tube protrudes out of the top of the outer tube;
the inner tube further comprises an inner sleeve inserted into the top of the outer tube and mounted around the inner tube; and
a distance is formed between the inner sleeve and the outer sleeve, and the restoring unit is mounted within the distance between the inner sleeve and the outer sleeve.

5. The foldable training wheel device as claimed in claim 4, wherein the restoring unit is a spring.

6. The foldable training wheel device as claimed in claim 5, wherein the outer tube comprises a connection plate formed on a side of the outer tube.

7. The foldable training wheel device as claimed in claim 4, wherein the outer tube comprises a connection plate formed on a side of the outer tube.

8. The foldable training wheel device as claimed in claim 3, wherein the outer tube comprises a connection plate formed on a side of the outer tube.

9. The foldable training wheel device as claimed in claim 2, wherein
the outer tube further comprises an outer sleeve mounted on a top of the outer tube and combined with a top of the inner tube;
the top of the inner tube protrudes out of the top of the outer tube;
the inner tube further comprises an inner sleeve inserted into the top of the outer tube and mounted around the inner tube; and
a distance is formed between the inner sleeve and the outer sleeve, and the restoring unit is mounted within the distance between the inner sleeve and the outer sleeve.

10. The foldable training wheel device as claimed in claim 9, wherein the outer tube comprises a connection plate formed on a side of the outer tube.

11. The foldable training wheel device as claimed in claim 2, wherein the outer tube comprises a connection plate formed on a side of the outer tube.

12. The foldable training wheel device as claimed in claim 1, wherein
the at least one riding recess includes two riding recesses and the at least one folding recess includes two folding recesses, wherein the two riding recesses are recessed in the positioning unit diametrically opposite each other, and the two folding recesses are recessed in the positioning unit diametrically opposite each other; and
the engagement unit is inserted through the inner tube radially, and two ends of the engagement unit protrude out of the inner tube, wherein the two ends of the engagement unit are respectively and selectively engaged in the two riding recesses or the two folding recesses.

13. The foldable training wheel device as claimed in claim 12, wherein
the outer tube further comprises an outer sleeve mounted on a top of the outer tube and combined with a top of the inner tube;
the top of the inner tube protrudes out of the top of the outer tube;
the inner tube further comprises an inner sleeve inserted into the top of the outer tube and mounted around the inner tube; and
a distance is formed between the inner sleeve and the outer sleeve, and the restoring unit is mounted within the distance between the inner sleeve and the outer sleeve.

14. The foldable training wheel device as claimed in claim 13, wherein the restoring unit is a spring.

15. The foldable training wheel device as claimed in claim 14, wherein the outer tube comprises a connection plate formed on a side of the outer tube.

16. The foldable training wheel device as claimed in claim 13, wherein the outer tube comprises a connection plate formed on a side of the outer tube.

17. The foldable training wheel device as claimed in claim 12, wherein the outer tube comprises a connection plate formed on a side of the outer tube.

18. The foldable training wheel device as claimed in claim 1, wherein
the outer tube further comprises an outer sleeve mounted on a top of the outer tube and combined with a top of the inner tube;
the top of the inner tube protrudes out of the top of the outer tube;
the inner tube further comprises an inner sleeve inserted into the top of the outer tube and mounted around the inner tube; and
a distance is formed between the inner sleeve and the outer sleeve, and the restoring unit is mounted within the distance between the inner sleeve and the outer sleeve.

19. The foldable training wheel device as claimed in claim 18, wherein the outer tube comprises a connection plate formed on a side of the outer tube.

20. The foldable training wheel device as claimed in claim 1, wherein the outer tube comprises a connection plate formed on a side of the outer tube.

\* \* \* \* \*